US009180859B2

(12) United States Patent
Stares et al.

(10) Patent No.: US 9,180,859 B2
(45) Date of Patent: Nov. 10, 2015

(54) VEHICLE AND METHOD OF CONTROLLING A VEHICLE

(75) Inventors: Pete Stares, Whitley (GB); Ian Beverley, Whitley (GB); Brett Hallam, Moreton in Marsh (GB); Shaun Wick, Solihall (GB); Russell Percy Osborn, Warwick (GB); Mark Rathbone, Leamington Spa (GB)

(73) Assignee: Jaguar Land Rover Limited, Whitley, Coventry, Warwickshire (GB)

( * ) Notice: Subject to any disclaimer, the term of this patent is extended or adjusted under 35 U.S.C. 154(b) by 0 days.

(21) Appl. No.: 14/000,370
(22) PCT Filed: Feb. 20, 2012
(86) PCT No.: PCT/EP2012/052848
§ 371 (c)(1),
(2), (4) Date: Oct. 29, 2013
(87) PCT Pub. No.: WO2012/110656
PCT Pub. Date: Aug. 23, 2012

(65) Prior Publication Data
US 2014/0080673 A1    Mar. 20, 2014

(30) Foreign Application Priority Data
Feb. 18, 2011    (GB) .................................. 1102820.6

(51) Int. Cl.
*B60W 10/02*    (2006.01)
*B60W 10/04*    (2006.01)
(Continued)

(52) U.S. Cl.
CPC ................ *B60W 10/06* (2013.01); *B60K 17/34* (2013.01); *B60K 17/35* (2013.01);
(Continued)

(58) Field of Classification Search
CPC ..... B60W 10/02; B60W 10/14; B60W 10/16; B60W 10/119; B60W 2510/0291; B60W 10/029; B60W 2710/215
USPC .......... 477/166, 174, 177, 180; 475/159, 160, 475/117, 116; 180/233, 245, 246, 65.7; 192/82 T, 49
See application file for complete search history.

(56) References Cited
U.S. PATENT DOCUMENTS
5,119,900 A * 6/1992 Watanabe et al. ............. 180/245
5,353,889 A * 10/1994 Hamada ......................... 180/242
(Continued)

FOREIGN PATENT DOCUMENTS
EP    1632689 A2    3/2006
EP    1749725 A2    2/2007
(Continued)

OTHER PUBLICATIONS
JP 11-157,355 A (machine translation)—NTN Toyo Bearing Co Ltd (Jun. 15, 1999).*
(Continued)

*Primary Examiner* — Robert Hodge
*Assistant Examiner* — Tinh Dang
(74) *Attorney, Agent, or Firm* — Reising Ethington P.C.

(57) ABSTRACT

Embodiments of the present invention provide a motor vehicle having: a prime mover; first and second groups of one or more wheels; and a driveline to connect the prime mover to the first and second groups of one or more wheels such that the first group of one or more wheels and not the second group may be driven by the prime mover when the driveline is in a first mode of operation and both the first and second group of one or more wheels may be driven by the prime mover when the driveline is in a second mode of operation, the driveline including an auxiliary portion comprising a first releasable torque transmitting means, a prop shaft and a second releasable torque transmitting means, the first releasable torque transmitting means being operable to connect a first end of the prop shaft to the prime mover, the second releasable torque transmitting means being operable to connect a second end of the prop shaft to the second group of one or more wheels, the vehicle further comprising control means operable to control the first and second torque transmitting means to switch the driveline between the first and second modes of operation such that in the first mode the prop shaft is disconnected from both the prime mover and said second group of one or more wheels by means of the first and second releasable torque transmitting means, in the first mode the control means being operable automatically to connect the prop shaft to only one selected from amongst the prime mover and the second group of one or more wheels by means of the first or second releasable torque transmitting means responsive to a value of a temperature parameter determined by the control means, the temperature parameter corresponding to a temperature of a component of the vehicle.

23 Claims, 3 Drawing Sheets (51) Int. Cl.
*B60W 10/06* (2006.01)
*B60K 17/34* (2006.01)
*B60K 17/35* (2006.01)
*B60K 23/08* (2006.01)
*F16H 59/72* (2006.01)

(52) U.S. Cl.
CPC ............ *B60K 23/08* (2013.01); *B60K 23/0808* (2013.01); *B60W 10/02* (2013.01); *B60K 2023/0858* (2013.01); *B60W 2510/0291* (2013.01); *F16H 59/72* (2013.01); *Y02T 10/56* (2013.01); *Y10T 477/75* (2015.01)

(56) References Cited

U.S. PATENT DOCUMENTS

| | | | | |
|---|---|---|---|---|
| 6,095,276 | A * | 8/2000 | Kuroda et al. | 180/247 |
| 7,048,084 | B2 * | 5/2006 | Shigeta et al. | 180/248 |
| 7,553,257 | B2 * | 6/2009 | Shigeta et al. | 477/98 |
| 7,775,933 | B2 * | 8/2010 | Yano et al. | 477/98 |
| 8,016,093 | B2 * | 9/2011 | Capito | 192/54.3 |
| 2003/0079954 | A1 * | 5/2003 | Murakami et al. | 192/82 T |
| 2004/0129475 | A1 | 7/2004 | Forsyth et al. | |
| 2008/0196962 | A1 | 8/2008 | Capito | |
| 2009/0076696 | A1 * | 3/2009 | Perkins et al. | 701/69 |
| 2010/0130328 | A1 | 5/2010 | Eberhard et al. | |
| 2010/0218632 | A1 * | 9/2010 | Sasaki et al. | 74/416 |
| 2010/0252348 | A1 * | 10/2010 | Ueda et al. | 180/244 |
| 2010/0262326 | A1 * | 10/2010 | Buszek et al. | 701/29 |
| 2012/0029779 | A1 * | 2/2012 | Dickinson et al. | 701/69 |

FOREIGN PATENT DOCUMENTS

| | | |
|---|---|---|
| GB | 2407804 A | 5/2005 |
| JP | H11157355 A | 6/1999 |
| JP | 2004359132 A | 12/2004 |
| JP | 2006290241 A | 10/2006 |
| WO | WO2005057039 A1 | 6/2005 |
| WO | WO2011107222 A1 | 9/2011 |

OTHER PUBLICATIONS

International Search Report for PCT/EP2012/052848 dated Jun. 27, 2012, 4 pages.

Japanese Office Action for Patent Application No. 2013-553957, dated Jun. 13, 2014, 6 pages.

Great Britain Combined Search and Examination Report for corresponding application No. 1202804.9, dated Jun. 14, 2012, 7 pages.

* cited by examiner

VEHICLE AND METHOD OF CONTROLLING A VEHICLE

FIELD OF THE INVENTION

The present invention relates to a motor vehicle and to a method of controlling a motor vehicle. In particular but not exclusively the invention relates to motor vehicles such as all-terrain vehicles (ATVs) having a driveline that is operable change the number of wheels that provide torque to drive the vehicle.

BACKGROUND

It is known to provide a motor vehicle having a four wheel drive mode of operation in which motive power is supplied to each of two pairs of wheels of the vehicle. Motive power is supplied to the wheels by means of a driveline.

Some known vehicles are arranged such that motive power is permanently supplied to both pairs of wheels. Some other vehicles are arranged such that motive power is selectively supplied to either only one pair or to both pairs of wheels. A driver operable selector may be provided to allow the driver to select two wheel or four wheel operation. Some driveline systems require the vehicle to be stationary when transitioning between two and four wheel drive modes. Such systems may be referred to as static disconnect/reconnect systems.

GB2407804 discloses a dynamic driveline reconnect arrangement in which reconnection of two of the wheels to the driveline following disconnection of the wheels from the driveline may be undertaken when the vehicle is moving. Such a system may be referred to as a dynamic driveline reconnect system. The system disclosed in GB2407804 employs clutch arrangements to enable dynamic driveline reconnection.

The present inventors have recognised that a problem exists with vehicles equipped with static or dynamic reconnection systems. When a four wheel drive vehicle is operated in a two wheel drive mode, a portion of the driveline remains stationary due to the fact that is has been disconnected from the gearbox. Lubricant associated with that portion of the driveline can fall in temperature or otherwise remain at a temperature that can result in relatively poor lubrication of that portion of the driveline when four wheel drive operation is subsequently resumed.

It is an aim of embodiments of the present invention to at least partially mitigate the disadvantages of known driveline systems.

STATEMENT OF THE INVENTION

Embodiments of the invention may be understood by reference to the appended claims.

Aspects of the invention provide a motor vehicle and a method.

According to another aspect of the invention for which protection is sought there is provided a system for a vehicle having a prime mover, at least a pair of rear wheels, a shaft for connecting the prime mover to the rear wheels and first and second coupling means for selectively connecting the prop shaft to the prime mover and to the rear wheels, respectively, the system comprising control means configured to control at least one of the first and second coupling means to connect the prop shaft to at least one of the prime mover and the rear wheels in response to an operating temperature of the vehicle being below a predetermined temperature.

The operating temperature may comprise, by way of example and without limitation, an ambient temperature or a temperature of a fluid within the vehicle such as a coolant or lubricant. In one embodiment, the operating temperature comprises a temperature of a transmission fluid, such as a lubricating fluid surrounding the prop shaft.

In a further aspect of the invention for which protection is sought there is provided a motor vehicle having: a prime mover; first and second groups of one or more wheels; and a driveline to connect the prime mover to the first and second groups of one or more wheels such that the first group of one or more wheels and not the second group may be driven by the prime mover when the driveline is in a first mode of operation and both the first and second group of one or more wheels may be driven by the prime mover when the driveline is in a second mode of operation, the driveline including an auxiliary portion comprising a first releasable torque transmitting means, a prop shaft and a second releasable torque transmitting means, the first releasable torque transmitting means being operable to connect a first end of the prop shaft to the prime mover, the second releasable torque transmitting means being operable to connect a second end of the prop shaft to the second group of one or more wheels, the vehicle further comprising control means operable to control the first and second torque transmitting means to switch the driveline between the first and second modes of operation such that in the first mode the prop shaft is disconnected from both the prime mover and said second group of one or more wheels by means of the first and second releasable torque transmitting means, in the first mode the control means being operable automatically to connect the prop shaft to only one selected from amongst the prime mover and the second group of one or more wheels by means of the first or second releasable torque transmitting means responsive to a value of a temperature parameter determined by the control means, the temperature parameter corresponding to an operating temperature of the vehicle.

It is to be understood that reference herein to a group of one or more wheels includes reference to a group having a membership of only one wheel.

Embodiments of the invention have the advantage that lubricant of an auxiliary driveline may be maintained at a temperature at which the lubricant provides useful lubrication of components of the auxiliary driveline even when the driveline is operating in the first mode, without the vehicle being required to assume the second mode of operation.

The present inventors have recognised that when auxiliary drivelines are engaged when the lubricant is at a low temperature excessive wear of one or more components of the auxiliary driveline may occur. This is because the lubricant may have a relatively high viscosity at temperatures below a prescribed value and therefore provide relatively poor lubrication until the lubricant has warmed up. For example, relatively small amounts of lubricant may be supplied to certain components until the viscosity of the lubricant has fallen below a prescribed value. Furthermore, engagement of the auxiliary driveline may take longer when the lubricant is at a low temperature. In other words the auxiliary driveline may exhibit a relatively slow response to control commands.

It is to be understood that in vehicles having dynamic driveline connect/disconnect systems the auxiliary driveline may be reconnected to a prime mover of the vehicle when the vehicle is at a relatively high speed, requiring rapid acceleration of the auxiliary driveline to a relatively high rate of rotation. The potential therefore exists for severe wear of components of the driveline in circumstances in which the vehicle is operating in low ambient temperature environments.

Embodiments of the invention therefore have the advantage that excessive wear of an auxiliary driveline due to poor lubrication when the auxiliary driveline is initially engaged may be reduced. This is because in some embodiments of the invention when a vehicle operating temperature falls below a threshold value one of the first or second releasable torque transmitting means is engaged causing the auxiliary driveline to rotate. This in turn causes lubricant of the auxiliary driveline to increase in temperature, reducing a viscosity of the lubricant and enhancing lubrication of components of the auxiliary driveline.

It is to be understood that some drivelines that are switchable between first and second modes of operation (such as between two wheel drive and four wheel drive modes) are arranged to assume the second mode of operation when an ambient temperature falls below a prescribed value. This is typically so as to reduce a risk of the vehicle skidding due to slippery surface conditions.

However, in some situations the second mode of operation may not be considered necessary despite low ambient temperatures. For example, when driving on a dry, non-icy and relatively flat surface where a risk of skidding is low it may be preferable to remain in the first mode of operation in order to enjoy the benefit of reduced fuel consumption. One or more handling characteristics may also be modified if the second mode is assumed, and therefore it may be undesirable automatically to switch between the modes in circumstances such as that described above. However it may be desirable to ensure that lubricant of the auxiliary driveline is at or above a prescribed value at substantially all times in order to prevent excessive wear of the auxiliary driveline in the event that the second mode (such as a four wheel drive mode) is assumed subsequently.

Embodiments of the invention have the advantage that a lubricant of the auxiliary driveline may be maintained at or above a required temperature even when the driveline is in the first mode of operation.

In an embodiment the control means is operable automatically to connect the prop shaft to only one selected from amongst the prime mover and the second group of one or more wheels when the value of the temperature parameter falls below a first threshold value.

The temperature parameter may also be referred to as an operating temperature parameter.

In an embodiment the control means is operable automatically to disconnect the prop shaft from the selected one of the prime mover and the second group of one or more wheels responsive to the value of the temperature parameter.

In an embodiment the control means is operable automatically to disconnect the prop shaft from the selected one of the prime mover and the second group of one or more wheels when the value of the temperature parameter rises above a second threshold value.

This has the advantage that the prime mover is not required to continue turning the auxiliary driveline when the operating temperature has increased above the second threshold value. It is to be understood that the second threshold value may be selected to correspond to a temperature sufficiently high to allow useful lubrication of the auxiliary driveline in the event that the second mode of operation is resumed.

The second threshold value may be substantially the same as the first threshold value.

Alternatively the second threshold value may be greater than the first threshold value.

This feature has the advantage that a risk of mode chattering between the first and second modes of operation is reduced.

The first threshold value may be around −20° C. The second threshold value may be around −10° C. Other values are also useful.

Optionally the first threshold value is in the region of from −25° C. to −15° C. and the second threshold value is in the region of from around −15° C. to −10° C.

The temperature parameter may be one selected from amongst a temperature of an ambient environment, a temperature of a component of the auxiliary portion of the driveline, a temperature of a fluid of the auxiliary portion.

The temperature parameter may be determined by measurement of one selected from amongst a temperature of an ambient environment in which the vehicle is operating, a temperature of a component of the auxiliary portion of the driveline, a temperature of a fluid of the auxiliary portion of the driveline, a temperature of a component of the vehicle other than a component of the auxiliary portion of the driveline and a temperature of a fluid of the vehicle other than a fluid of the auxiliary portion of the driveline.

In the case that the operating temperature is the temperature of a fluid of the auxiliary portion of the driveline, the fluid may be a fluid of one or both of the first and second releasable torque transmitting means.

The temperature parameter may be determined based at least in part on one or more operating parameters of the vehicle other than a measured temperature value.

The first releasable torque transmitting means may comprise a first clutch means.

The first clutch means may comprise a wet clutch.

The second releasable torque transmitting means may comprise a second clutch means.

The second clutch means may comprise a wet clutch.

The auxiliary driveline may comprise a differential comprising a differential gear arrangement.

The second releasable torque transmitting means may be provided between the differential and the second group of one or more wheels.

Alternatively the second releasable torque transmitting means may be incorporated within the differential.

In an embodiment the second releasable torque transmitting means and differential gear arrangement are incorporated within a common housing.

The differential may comprise a free running differential.

The second group of wheels may comprise a plurality of wheels and the second releasable torque transmitting means may comprises a pair of clutches each clutch operable to transmit power to a respective different one or more wheels of the second group of wheels.

The vehicle may be further provided with a driver operable switch whereby the driver may select a desired one of the first and second modes of operation of the driveline.

Optionally the first group of wheels comprises a first pair of wheels and the first mode corresponds to a two wheel drive mode of operation wherein the first pair of wheels are driven by the prime mover.

The second group of wheels may comprise a second pair of wheels and the second mode of operation may correspond to a four wheel drive mode of operation.

Alternatively the second group of wheels may comprise a second and a third pair of wheels and the second mode of operation may correspond to a six wheel drive mode of operation.

At least one of the first and second groups of one or more wheels may comprise a plurality of pairs of wheels.

The prime mover may comprise at least one of an internal combustion engine and an electric machine.

In a further aspect of the invention for which protection is sought there is provided a method of controlling the temperature of a driveline in a motor vehicle having a prime mover and first and second groups of one or more wheels, the driveline being operable to connect the prime mover to the first and second groups of one or more wheels, the method comprising driving the first group of one or more wheels and not the second by the prime mover when the driveline is in a first mode of operation and driving the first and second groups of one or more wheels via an auxiliary portion of the driveline when the driveline is in a second mode of operation, the step of driving the second group of one or more wheels by means of the auxiliary portion comprising the step of connecting a prop shaft of the auxiliary portion to the prime mover and to the second group of one or more wheels by means of first and second releasable torque transmitting means respectively, when the driveline is in the first mode the method comprising the step of connecting the prop shaft to only one selected from amongst the prime mover and the second group of one or more wheels by means of one of the first or second releasable torque transmitting means responsive to an operating temperature of the vehicle.

In one aspect of the invention for which protection is sought there is provided a motor vehicle having: a prime mover; first and second groups of one or more wheels; and a driveline to connect the prime mover to the first and second groups of one or more wheels such that the first group of one or more wheels is driven by the prime mover when the driveline is in a first mode of operation and the second group of one or more wheels is additionally driven by the prime mover when the driveline is in a second mode of operation, the driveline including an auxiliary driveline comprising a first releasable torque transmitting means operable to connect the auxiliary driveline to the prime mover and a second releasable torque transmitting means downstream of the first releasable torque transmitting means operable to connect the auxiliary driveline to the second group of one or more wheels thereby to drive the second group, the vehicle further comprising control means operable to control the first and second torque transmitting means to switch the driveline between the first and second modes of operation such that in the first mode the auxiliary driveline is disconnected from both the prime mover and said second group of one or more wheels, in the first mode the control means being operable automatically to connect the auxiliary driveline to only one selected from amongst the prime mover and the second group of one or more wheels by means of the releasable torque transmitting means responsive to an operating temperature of the vehicle.

In a still further aspect of the invention for which protection is sought there is provided a method of controlling the temperature of a driveline in a motor vehicle having a prime mover; first and second groups of one or more wheels; and a driveline to connect the prime mover to the first and second groups of one or more wheels, the method comprising driving the first group of one or more wheels by the prime mover when the driveline is in a first mode of operation and additionally driving the second group of one or more wheels by the prime mover when the driveline is in a second mode of operation, the method further comprising controlling first and second torque transmitting means to switch the driveline between the first and second modes of operation, whereby in the first mode the auxiliary driveline is disconnected from both the prime mover and said second group of one or more wheels; the method comprising in the first mode connecting the auxiliary driveline to only one selected from amongst the prime mover and the second group of one or more wheels by means of the first or second releasable torque transmitting means responsive to an operating temperature of the vehicle.

In another aspect of the invention there is provided a method of controlling the temperature of a driveline in a motor vehicle having a prime mover; first and second groups of one or more wheels; and a driveline to connect the prime mover to the first and second groups of one or more wheels such that the first group of one or more wheels is driven by the prime mover when the driveline is in a first mode of operation and the second group of one or more wheels is additionally driven by the prime mover when the driveline is in a second mode of operation, the driveline including an auxiliary driveline comprising a first releasable torque transmitting means operable to connect the auxiliary driveline to the prime mover and a second releasable torque transmitting means operable to connect the auxiliary driveline to the second group of one or more wheels thereby to drive the second group, the method comprising controlling the first and second torque transmitting means to switch the driveline between the first and second modes of operation such that in the first mode the auxiliary driveline is disconnected from both the prime mover and said second group of one or more wheels; and in the first mode connecting the auxiliary driveline to only one selected from amongst the prime mover and the second group of one or more wheels by means of the releasable torque transmitting means responsive to an operating temperature of the vehicle.

Within the scope of this application it is envisaged that the various aspects, embodiments, examples and alternatives, and in particular the features thereof, set out in the preceding paragraphs, in the claims and/or in the following description and drawings, may be taken independently or in any combination thereof. For example, features described in connection with one embodiment are applicable to all embodiments, unless such features are incompatible.

BRIEF DESCRIPTION OF THE DRAWINGS

Embodiments of the invention will now be described, by way of example only, with reference to the accompanying figures in which.

DETAILED DESCRIPTION

Figure 1:
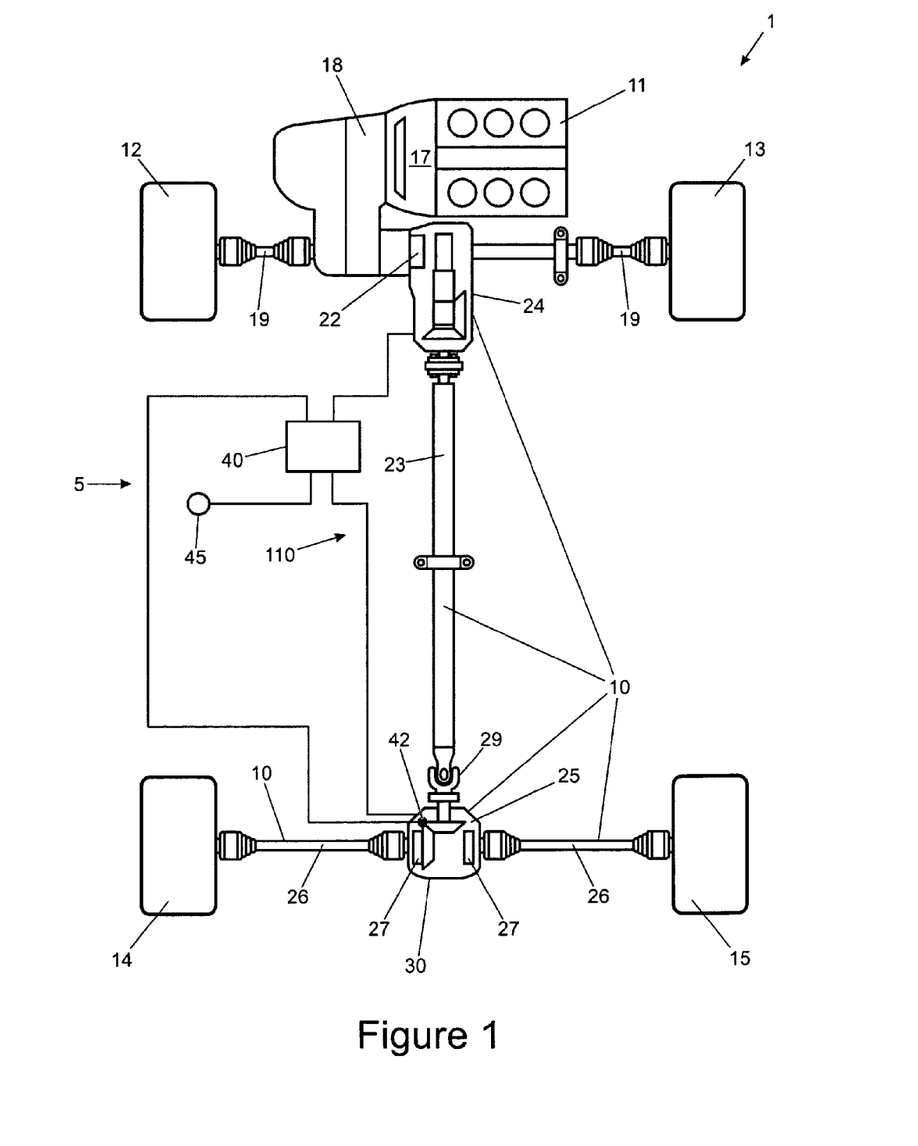
FIG. 1 is a schematic illustration of the driveline of a motor vehicle according to an embodiment of the invention.

FIG. 1 shows a motor vehicle 1 according to an embodiment of the present invention having a driveline 5. The driveline 5 is coupled to an internal combustion engine 11 via a gearbox 18 and includes a pair of front wheels 12, 13, an auxiliary driveline 10 and a pair of rear wheels 14, 15. The driveline 5 is arranged selectively to transmit power from the gearbox 18 to the front wheels 12, 13 only (in a two wheel drive mode of operation) or to the front wheels 12, 13 and the rear wheels 14, 15 simultaneously (in a four wheel drive mode of operation).

Power is transmitted from the internal combustion engine 11 to the front wheels 12, 13 by means of a clutch 17 coupled between the engine 11 and the gearbox 18 and a pair of front drive shafts 19 coupled to the gearbox 18. It is to be understood that where an automatic transmission is provided instead of a manual gearbox 18 a torque converter may be employed instead of a clutch 17.

Power is transmitted to the rear wheels 14, 15 by means of the auxiliary driveline 10.

The auxiliary driveline 10 has a releasable torque transmitting means in the form of a power transfer unit (PTU) 24 having a power transfer clutch (PTC) 22 operable to connect an auxiliary drive shaft or prop shaft 23 to the gearbox 18.

The prop shaft 23 is coupled in turn to a rear differential 30 operable to couple the prop shaft 23 to the rear drive shafts 26.

The rear differential 30 has a pair of clutches 27 by means of which the rear differential 30 is operable to connect the prop shaft 23 to the rear drive shafts 26 when the four wheel drive mode of operation is required.

The driveline 5 has a controller 40 coupled to a temperature sensor 42 mounted in the rear differential 30. The temperature sensor 42 is arranged to measure a temperature T of lubricant in the rear differential 30.

In some alternative embodiments the temperature sensor 42 is arranged to measure the temperature of another fluid such as a fluid of the PTU 24 or of a different component of the vehicle 1. In some embodiments the sensor 42 is arranged to measure an ambient temperature of the environment in which the vehicle 1 is operating.

In some embodiments, instead of being directly coupled to the temperature sensor 42 the controller 40 is arranged to receive data indicative of the particular temperature of interest, for example by means of another electronic control unit (ECU) such as a vehicle management system. In some embodiments the controller 40 is arranged to receive the data by means of a controller area network (CAN) bus.

It is to be understood that the prop shaft 23 does not normally rotate when the driveline 5 is in the two wheel drive mode of operation and the PTC 22 is open. In low ambient temperatures lubricating oil associated with the prop shaft 23 can therefore cool to temperatures at which lubrication provided by the oil is unacceptably low. Consequently a rate at which components of the auxiliary portion 10 of the driveline 5 may be actuated may be reduced. This can result in suboptimal performance of the driveline 5, for example when rapid actuation of components of the driveline 5 is required in order to transition from the two wheel to four wheel drive modes.

When the driveline 5 is in the two wheel drive mode of operation, in which the engine 11 is driving the front pair of wheels 12, 13 only and the PTC 22 is open, the controller 30 is arranged to close the PTC 22 if the temperature T of the lubricant of the differential 30 falls below a threshold value $T_1$. This causes the prop shaft 23 to turn and therefore substantially all components of the auxiliary portion 10 of the driveline 5 that normally rotate when the vehicle 1 is moving in the four wheel drive mode of operation are caused to rotate.

It is to be understood that the specific arrangements of gears and clutches may differ in some embodiments from that illustrated in FIG. 1. Therefore in some arrangements it is possible that not all components of the auxiliary portion 10 of the driveline 5 that rotate in the second mode of operation will rotate when the PTU clutch 22 is closed and the rear wheels 14, 15 are disconnected from the prop shaft 23.

The controller 40 is arranged to open the PTC 22 to disconnect the prop shaft 23 from the gearbox 18 when the temperature T of the lubricant of the differential 30 rises above a second threshold value $T_2$. In some embodiments $T_2$ is greater than $T_1$. In some alternative embodiments $T_1$ is substantially equal to $T_2$.

In some embodiments $T_1$ may be around $-20°$ C. and $T_2$ may be around $-10°$ C. Other temperatures are also useful.

It is to be understood that by setting $T_2$ to a value that is greater than $T_1$ a hysteresis is introduced into the operational state of the driveline 5. The introduction of hysteresis is arranged to reduce a risk of multiple switching operations to connect and disconnect the prop shaft 23 from the engine 11 (a phenomenon known as 'mode chattering') when the measured value of ambient temperature T repeatedly rises and falls through a threshold value. Such fluctuations in the measured value of T may arise for example due to noise in the measured temperature signal or due to actual environmental fluctuations in temperature.

Figure 2:
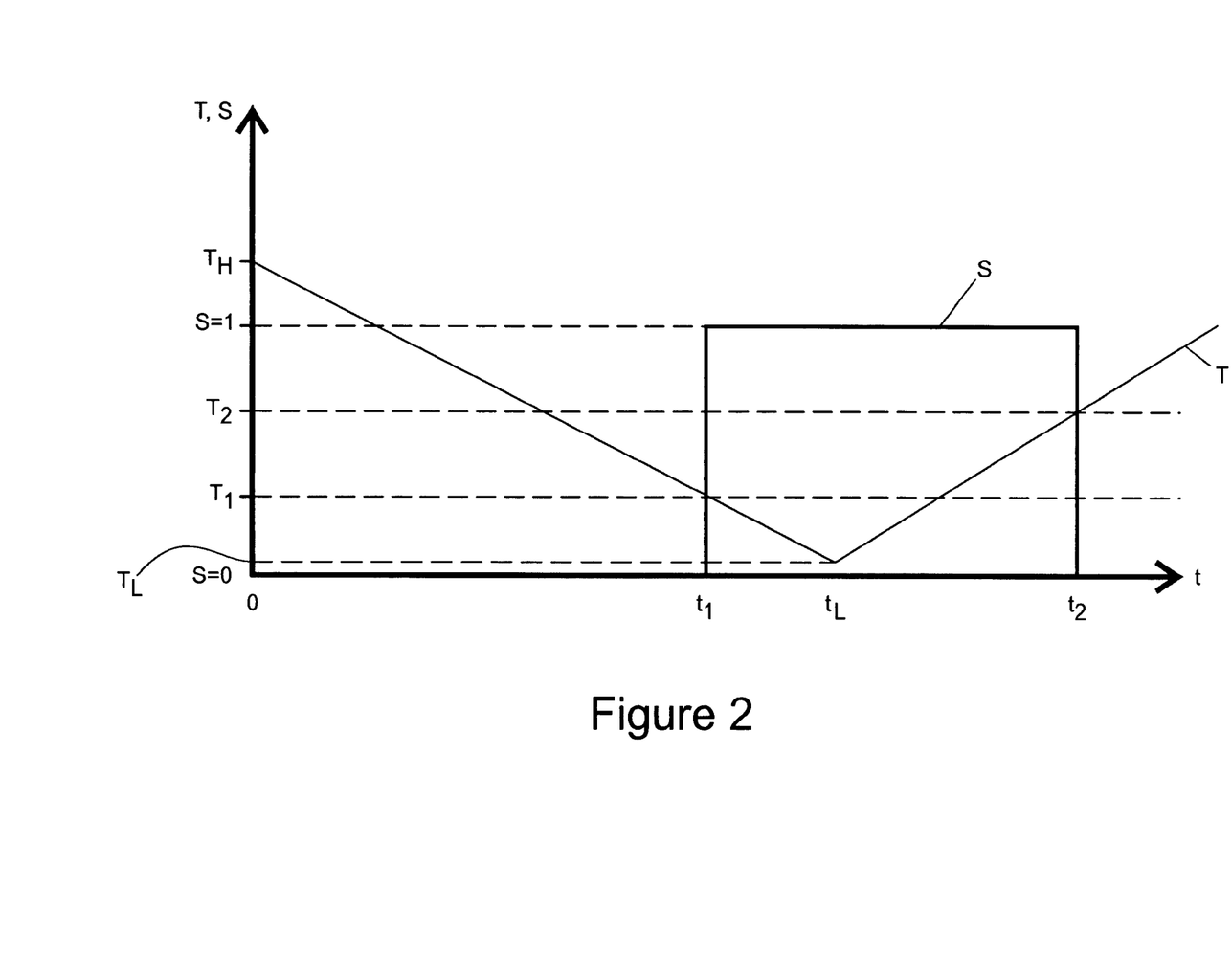
FIG. 2 is a plot of vehicle operating temperature T as a function of time t for a drivecycle showing the state S of a releasable torque transmitting device of an auxiliary driveline of the vehicle over the drivecycle.

FIG. 2 is a plot of temperature T of the lubricant of the rear differential 30 as a function of time t during a drivecycle. The state S of the PTC 22 is shown superimposed on the plot. State S=1 corresponds to PTC 22 in the closed condition whilst state S=0 corresponds to PTC 22 in the open condition.

It can be seen from the plot that as the temperature decreases from a relatively high temperature $T_H$ through $T=T_1$ to a relatively low temperature $T_L$ the state S of the PTC 22 switches from S=0 to S=1. As the temperature rises again, S remains set to 1 as the temperature rises above $T=T_1$ until the temperature exceeds $T=T_2$ where $T_2>T_1$. S is then set back to the original value S=0.

It is to be understood that in some alternative embodiments the differential clutches 27 are closed in order to spin up the prop shaft 23 instead of the PTC 22 when the temperature falls below the first threshold value $T_1$.

It is to be understood that the controller 40 may be coupled to a driver operable switch 45 allowing the driver to select the two-wheel drive mode or four-wheel drive mode of operation. These modes may be placarded within the vehicle as 'on-road' and 'off-road' modes respectively.

Figure 3:
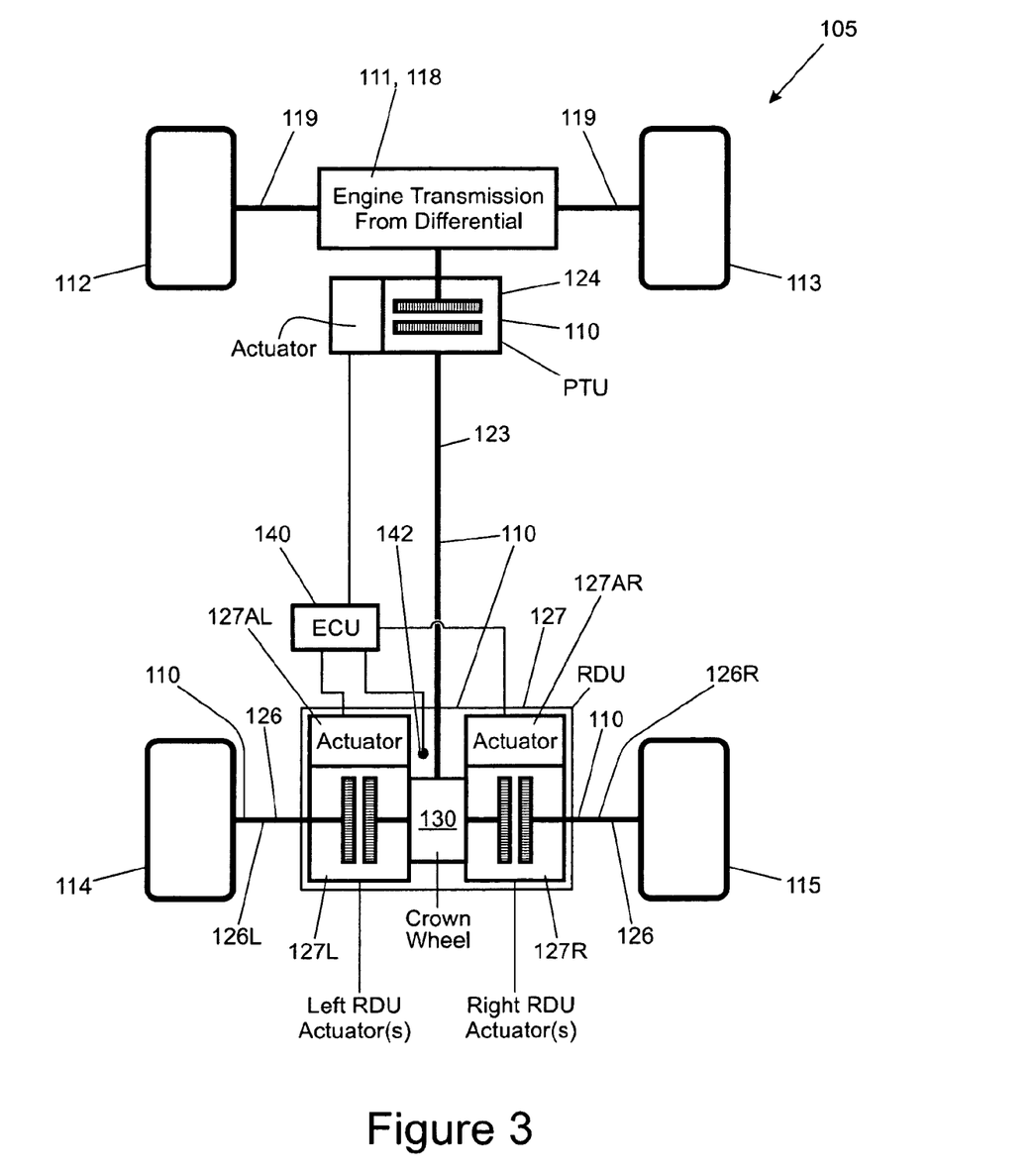
FIG. 3 is a schematic illustration of the driveline of a motor vehicle according to a further embodiment of the invention having a rear drive unit (RDU).

FIG. 3 shows a vehicle 100 having a driveline 105 according to a further embodiment of the invention. Like features of the embodiment of FIG. 3 to those of the embodiment of FIG. 1 are provided with like reference signs prefixed numeral 1.

The embodiment of FIG. 3 is similar to that of FIG. 1 in that driveline 105 has a power transfer unit (PTU) 124 (sometimes referred to as a power take off unit) operable to connect one end of a prop shaft 123 of an auxiliary portion 10 of the driveline 105 to the engine 111 via a gearbox 118.

However, instead of a rear differential 30, the auxiliary portion 110 has a rear drive unit (RDU) 127. In the embodiment of FIG. 3 the RDU 127 has a crown wheel 130 coupled to an end of the prop shaft 123 opposite the end of the prop shaft 123 that is connected to the PTU 124.

The RDU 127 also has a pair of friction clutches 127L, 127R operable to couple the crown wheel 130 to left and right rear drive shafts 126L, 126R, respectively.

The RDU 127 is provided with left and right actuators 127AL, 127AR operable to open and close the left and right friction clutches 127L, 127R respectively. The actuators 127AL, 127AR are arranged such that as the actuators 127AL, 127AR move from a first position in which both clutches 127L, 127R are open towards a second position in which both clutches 127L, 127R are closed, pressure is applied to the respective clutches 127L, 127R thereby to close the clutches 127L, 127R.

It is to be understood that the prop shaft 123 can be connected to the rear wheels 114, 115 by means of the RDU 127 in order to rotate the prop shaft 123 and warm lubricating oil of the auxiliary portion 110 of the driveline 105. With the RDU 127 so configured the PTU 124 may be maintained in an open condition in which the prop shaft 123 is not connected to the gearbox 118 so that the driveline 105 does not assume the four wheel drive mode of operation.

Alternatively the prop shaft 123 may be connected to the gearbox 118 by means of the PTU 124 and the RDU 127 arranged to isolate the prop shaft 123 from the rear wheels 114, 115. This has the effect that lubricating oil in both the PTU 124 and portions or substantially the whole of the RDU 127 may be maintained at or above a required temperature without the driveline 105 being required to assume the four wheel drive mode of operation.

Other arrangements are also useful.

Embodiments of the invention have the advantage that lubricating fluid of the auxiliary portion 10, 110 of the driveline 5, 105 may be maintained at or above a temperature at which the fluid can provide sufficient lubrication of the auxiliary portion 10, 110 without fully engaging the auxiliary portion 10, 110, i.e. connecting the prop shaft 23, 123 to both the gearbox 18, 118 and rear wheels 14, 15, 114, 115. This has the advantage that handling characteristics of the vehicle remain substantially unchanged because the rear wheels 14, 15, 114, 115 are not powered directly by the engine 11, 111 as in the second mode of operation of the driveline 10, 110.

Throughout the description and claims of this specification, the words "comprise" and "contain" and variations of the words, for example "comprising" and "comprises", means "including but not limited to", and is not intended to (and does not) exclude other moieties, additives, components, integers or steps.

Throughout the description and claims of this specification, the singular encompasses the plural unless the context otherwise requires. In particular, where the indefinite article is used, the specification is to be understood as contemplating plurality as well as singularity, unless the context requires otherwise.

Features, integers, characteristics, compounds, chemical moieties or groups described in conjunction with a particular aspect, embodiment or example of the invention are to be understood to be applicable to any other aspect, embodiment or example described herein unless incompatible therewith.

This application claims priority from UK patent application no. GB1102820.6 filed 18 Feb. 2011, the entire contents of which are expressly incorporated by reference herein.

The invention claimed is:

1. A motor vehicle having:
   a prime mover;
   first and second groups of one or more wheels; and
   a driveline to connect the prime mover to the first and second groups of one or more wheels such that the first group of one or more wheels and not the second group may be driven by the prime mover when the driveline is in a first mode of operation and both the first and second group of one or more wheels may be driven by the prime mover when the driveline is in a second mode of operation,
   the driveline including an auxiliary portion comprising a first releasable torque transmitting means, a prop shaft and a second releasable torque transmitting means, the first releasable torque transmitting means being operable to connect a first end of the prop shaft to the prime mover, the second releasable torque transmitting means being operable to connect a second end of the prop shaft to the second group of one or more wheels,
   the vehicle further comprising a control unit operable to control the first and second torque transmitting means to switch the driveline between the first and second modes of operation, wherein when the vehicle is in the first mode and the prop shaft is disconnected from both the prime mover and said second group of one or more wheels the control unit is operable automatically to connect the prop shaft to only one selected from amongst the prime mover and the second group of one or more wheels by the first or second releasable torque transmitting means responsive to a value of a temperature parameter corresponding to an operating temperature of the vehicle.

2. A vehicle as claimed in claim 1 wherein the control unit is operable automatically to connect the prop shaft to only one selected from amongst the prime mover and the second group of one or more wheels when the value of the temperature parameter falls below a first threshold value.

3. A vehicle as claimed in claim 2 wherein the control unit is operable automatically to disconnect the prop shaft from the selected one of the prime mover and the second group of one or more wheels responsive to the value of the temperature parameter.

4. A vehicle as claimed in claim 3 wherein the control unit is operable automatically to disconnect the prop shaft from the selected one of the prime mover and the second group of one or more wheels when the temperature parameter rises above a second threshold value.

5. A vehicle as claimed in claim 4 wherein the second threshold value is substantially the same as the first threshold value.

6. A vehicle as claimed in claim 4 wherein the second threshold value is greater than the first threshold value.

7. A vehicle as claimed in claim 6 wherein the first threshold value is in the range from −25° C. to −15° C. and the second threshold value is in the range from around −15° C. to −10° C.

8. A vehicle as claimed in claim 1 wherein the temperature parameter is determined by measurement of one selected from amongst a temperature of an ambient environment in which the vehicle is operating, a temperature of a component of the auxiliary portion of the driveline, a temperature of a fluid of the auxiliary portion of the driveline, a temperature of a component of the vehicle other than a component of the auxiliary portion of the driveline and a temperature of a fluid of the vehicle other than a fluid of the auxiliary portion of the driveline.

9. A vehicle as claimed in claim 8 wherein the temperature parameter is determined by measurement of the temperature of a fluid of the auxiliary portion of the driveline, the fluid being a fluid of one or both of the first and second releasable torque transmitting means.

10. A vehicle as claimed in claim 1 wherein the temperature parameter is determined based at least in part on one or more operating parameters of the vehicle other than a measured temperature value.

11. A vehicle as claimed in claim 1 wherein the first releasable torque transmitting means comprises first clutch means, optionally wet clutch means and/or the second releasable torque transmitting means comprises second clutch means, optionally wet clutch means.

12. A vehicle as claimed in claim 1 wherein the auxiliary portion of the driveline comprises a differential gear arrangement.

13. A vehicle as claimed in claim 12 wherein the second releasable torque transmitting means is provided between the differential gear arrangement and the second group of one or more wheels.

14. A vehicle as claimed in claim 12 wherein the second releasable torque transmitting means and differential gear arrangement are incorporated within a common housing.

15. A vehicle as claimed in claim 12 wherein the differential gear arrangement comprises a free running differential gear arrangement.

16. A vehicle as claimed in claim 11 wherein the second group of wheels comprises a plurality of wheels and the second releasable torque transmitting means comprises a plurality of clutches each clutch operable to transmit power to a respective different one of the plurality of wheels of the second group of wheels.

17. A vehicle as claimed in claim 1 further provided with a driver operable switch whereby the driver may select a desired one of the first and second modes of operation of the driveline.

18. A vehicle as claimed in claim 1 wherein the first group of wheels comprises a first pair of wheels and the first mode corresponds to a two wheel drive mode of operation wherein the first pair of wheels are driven by the prime mover.

19. A vehicle as claimed in claim 1 wherein the second group of wheels comprises a second pair of wheels and the second mode of operation corresponds to a four wheel drive mode of operation.

20. A vehicle as claimed in claim 1 wherein the second group of wheels comprises a second and a third pair of wheels and the second mode of operation corresponds to a six wheel drive mode of operation.

21. A vehicle as claimed in claim 1 wherein at least one of the first and second groups of one or more wheels comprises a plurality of pairs of wheels.

22. A method of controlling the temperature of a driveline in a motor vehicle having a prime mover and first and second groups of one or more wheels, the driveline being operable to connect the prime mover to the first and second groups of one or more wheels, the method comprising driving the first group of one or more wheels and not the second by the prime mover when the driveline is in a first mode of operation and driving the first and second groups of one or more wheels via an auxiliary portion of the driveline when the driveline is in a second mode of operation, the step of driving the second group of one or more wheels by the auxiliary portion comprising the step of connecting a prop shaft of the auxiliary portion to the prime mover and to the second group of one or more wheels by first and second releasable torque transmitting means respectively, when the driveline is in the first mode and the prop shaft is disconnected from both the prime mover and said second group of one or more wheels the method comprising the step of connecting the prop shaft to only one selected from amongst the prime mover and the second group of one or more wheels by one of the first or second releasable torque transmitting means responsive to an operating temperature of the vehicle.

23. A system for a vehicle having a prime mover, at least a pair of rear wheels, a prop shaft for connecting the prime mover to the rear wheels and a first coupling means for selectively connecting the prop shaft to the prime mover and a second coupling means for selectively connecting the prop shaft to the rear wheels, the system comprising a control unit configured to control one of the first and second coupling means to connect the prop shaft to only one of the prime mover and the rear wheels in response to an operating temperature of the vehicle being below a predetermined temperature.

* * * * *